2,982,608

PROCESS FOR PURIFYING AQUEOUS SOLUTIONS BY REMOVING HEAVY METALS, MORE PARTICULARLY FROM BRINES INTENDED FOR ELECTROLYSIS

Jean Clement, Boitsfort-Brussels, Belgium, assignor to Solvay & Cie, Brussels, Belgium, a Belgian company No Drawing. Filed May 14, 1957, Ser. No. 658,966

Claims priority, application Belgium May 16, 1956

3 Claims. (Cl. 23—89)

It is known that during electrolysis of solutions of alkali metal salts, for example sodium chloride, the impurities which these salts contain act in an unfavourable manner on the yield of the electrolysis.

The accumulation of certain metallic impurities in mercury tends to produce deposits on the conducting bottom of the electrolytic cell; the presence in the brine of frequent impurities such as magnesium, iron, calcium and aluminium promotes the evolution of hydrogen. But it is the compounds of vanadium, chromium, tungsten and molybdenum which produce the most untoward action even when they are present in only very small quantities and it is, furthermore, difficult to separate these metals in the usual purification processes.

It has been proposed (Swedish Patent No. 133,866) to precipitate these metals by means of lead salts and to separate them as vanadates, chromates, tungstates or molybdates of lead. However the precipitation is always limited by the solubility of these bodies, which solubilities can exceed the limits of tolerance of the metals which are harmful in electrolysis. Moreover, in the application of the process described in the patent, lead is introduced into electrolytic brine which did not previously contain it.

It has likewise been proposed to entrain the said impurities on other precipitates which act as "collectors." Thus Germany patent application F15,167 describes a process which consists in introducing into the liquid to be purified compounds of iron or aluminium in the trivalent state and by subsequently rendering the solution alkaline, to precipitate the metals as hydroxides which entrain the precipitates of the heavy metals (W, Mo, V, Cr) simultaneously formed. This entrainment can require considerable consumption of aluminium or iron salts before their influence becomes appreciable.

It has further been proposed to make use of silicon compounds, including water glass (Dutch patent specification No. 68,706) but this does not appear to be a process in current use.

It is also known (Publication Board 73,656—Frames 3646 to 3663) that between the impurities which are dissolved or in colloidal suspension and hydroxides such as $Mg(OH)_2$, there can be produced a chemical bonding or adsorption of the said impurities. The magnesium hydroxide entrains these impurities and brings about their flocculation according to a process similar to that which is applied in the purification of water.

It is true that the entrainment of the impurities by adsorption on a "collector" offers the big advantage of eliminating them to a greater extent than can be achieved by chemical precipitation.

The adsorption of a metal (in the ionic state) present in a liquid is subject to several conditions among which the following one may be mentioned: It is necessary that the ionic size of the metal or the metallic compound to be adsorbed should be similar to, or less than, that of the crystal unit of the adsorbing substance.

In a typical purification (by caustic soda and sodium carbonate) of an electrolytic brine for example, there are principally eliminated as precipitates calcium carbonate, magnesium and iron hydroxides, the other impurities which are more harmful found in the brine in the form of vanadates, tungstates, molybdates and chromates not being adsorbed in appreciable quantities on the aforesaid precipitates.

The present invention has as object a process for purifying solutions containing as impurities heavy metals, such as vanadium, tungsten, molybdenum and chromium in a high oxidation state (even the maximum) by the adsorption on precipitates of other metal compounds, and it is characterised by the fact that the heavy metals are brought to a lower valency state by methods of reduction known as such, and that these are then brought into the presence of a precipitate which entrains them by adsorption.

In the reduction of a vanadate, for example, it is reduced to the vanadyl state of which the ionic dimensions correspond to those of the crystal unit of precipitates usual in the purification of water or electrolytic brine.

The purification of the solution according to the invention can be carried out in one or several steps in the sense that, after the chemical treatment or reduction, the addition of all the purifying reactants can be effected simultaneously once, or several times with intermediate decanting.

The purification can also comprise the use of "coprecipitates" or "collectors"; the choice of metals to be added is always directed towards the same consideration: It must normally precipitate under conditions usual in purification, in a form such that the precipitate obtained is a crystalline unit of adequate size.

This "collector" may be introduced as a pre-formed precipitate, even without a previous purification other than that for removing the heavy metals.

*Example 1*

A solution to be purified contains the following in grams per litre.

| | |
|---|---|
| NaCl | 310 |
| Ca | 0.3 |
| Mg | 0.017 |
| Fe | 0.003 |
| V | [1] 0.001 |

[1] In the form of vanadate.

After bringing 300 cubic centimetres of this solution to a pH of 2.5, one adds 2.5 grams of sodium carbonate and the quantity of caustic soda necessary to obtain a pH of 11.

The precipitate formed is then separated and the solution which remains now contains in grams per litre:

| | |
|---|---|
| NaCl | 308 |
| Ca | 0.001 |
| Mg | 0.001 |
| Fe | 0.0005 |
| V | 0.001 |

The quantity of vanadium collected by the various precipitates is insignificant and too small to be measured.

*Example 2*

300 cubic centimetres of the solution in Example 1 are brought to a pH of 2.5; 3 cubic centimetres of a solution of 30% sodium bisulphite are added and purification proceeds as usual as in Example 1.

The precipitate formed is then separated and the solution now contains in grams per litre:

| | |
|---|---|
| NaCl | 308 |
| Ca | 0.001 |
| Mg | 0.001 |
| Fe | 0.0005 |
| V | 0.0007 |

The quantity of vanadium entrained by the precipitate represents about 30% of that which was initially in the solution.

*Example 3*

300 cubic centimetres of the solution of Example 1 are brought to a pH of 2.5; 78 grams of an amalgam containing 1.3 gram of sodium per kilogram of amalgam are added which act simultaneously as reducing agent and a source of caustic soda; 2.5 grams of sodium carbonate are then added. The precipitate formed is then separated and the remaining solution now contains:

| | |
|---|---|
| NaCl | 308 |
| Ca | 0.001 |
| Mg | 0.001 |
| Fe | 0.0005 |
| V | 0.0008 |

The quantity of vanadium entrained by the precipitate represents about 20% of that present initially.

I claim:

1. A process for the purification of an aqueous solution of an alkali metal halide containing as impurities at least one compound of a heavy metal selected from the group consisting of vanadium, tungsten, molybdenum and chromium which is in a high valency state which comprises the steps of reducing said heavy metal in said compounds to a lower valency and bringing the compounds of the lower valent heavy metal thus produced into contact with a precipitate of a member of the group consisting of hydroxides and carbonates of metals other than vanadium, tungsten, molybdenum, and chromium, the ionic size of said lower-valency compounds being at most equal to that of the crystal unit of said precipitate, whereby at least some of said heavy metal is removed from said solution by said precipitate, and separating said precipitate from said solution.

2. A process for the purification of an aqueous solution of an alkali metal halide containing as impurities at least one compound of a heavy metal selected from the group consisting of vanadium, tungsten, molybdenum and chromium which is in a high valency state which comprises the steps of reducing said heavy metal in said compounds to a lower valency and bringing the compounds of the lower valent heavy metal thus produced into contact with a precipitate of a member of the group consisting of hydroxides and carbonates of metals other than vanadium, chromium, tungsten, and molybdenum, said precipitate being formed in situ, the ionic size of said lower-valency compounds being at most equal to that of the crystal unit of said precipitate, whereby at least some of said heavy metal is removed from said solutions by said precipitate, and separating said precipitate from said solution.

3. A process for the purification of an aqueous solution of an alkali metal halide containing as impurities at least one compound of a heavy metal selected from the group consisting of vanadium, tungsten, molybdenum and chromium which is in a high valency state which comprises the steps of reducing said heavy metal in said compounds to a lower valency, and adding to said solution containing the compounds of the lower valent heavy metal thus produced a precipitate of a member of the group consisting of hydroxides and carbonates of metals other than vanadium, chromium, tungsten, and molybdenum, the ionic size of said lower-valency compounds being at most equal to that of the crystal unit of said precipitate, whereby at least some of said heavy metal is removed from said solutions by said precipitate, and separating said precipitate from said solution.

References Cited in the file of this patent

UNITED STATES PATENTS

| 304,341 | Mebus | Sept. 2, 1884 |
|---|---|---|
| 1,500,126 | Hanson et al. | July 8, 1924 |

FOREIGN PATENTS

| 698,228 | Great Britain | Oct. 7, 1953 |